United States Patent [19]
Suzuki et al.

[11] Patent Number: 5,517,608
[45] Date of Patent: May 14, 1996

[54] COMMUNICATION APPARATUS AND METHOD

[75] Inventors: Noriyuki Suzuki, Tokyo; Kazutoshi Shimada, Yokosuka; Eisaku Tatsumi, Yokohama; Shinichi Sunakawa, Kawasaki; Katsuhiko Nagasaki, Ichikawa, all of Japan

[73] Assignee: Canon Kabushiki Kaisha, Tokyo, Japan

[21] Appl. No.: 292,000

[22] Filed: Aug. 18, 1994

[30] Foreign Application Priority Data

Aug. 24, 1993 [JP] Japan ............................ 5-230885

[51] Int. Cl.⁶ .................................................. H04B 10/00
[52] U.S. Cl. ........................ 359/161; 359/172; 359/155; 359/180; 359/152
[58] Field of Search ................................. 359/143, 145, 359/152, 154, 155, 157, 159, 172, 180, 189; 372/30, 29, 31

[56] References Cited

U.S. PATENT DOCUMENTS 5,303,248  4/1994  Gibbs ........................................ 372/30
5,349,460  9/1994  Ogawahara et al. ..................... 359/152

FOREIGN PATENT DOCUMENTS

| | | |
|---|---|---|
| 2042833 | 2/1990 | Japan . |
| 0194742 | 8/1990 | Japan ..................... 359/155 |
| 2661240 | 10/1990 | Japan . |
| 4067836 | 3/1992 | Japan . |
| 4119025 | 4/1992 | Japan . |

*Primary Examiner*—Leo Boudreau
*Assistant Examiner*—Bhavesh Mehta
*Attorney, Agent, or Firm*—Fitzpatrick, Cella, Harper & Scinto

[57] ABSTRACT

A communication apparatus which can communicate by a proper light intensity and can prevent excessive electric power consumption without providing light intensity measuring means on the reception side is provided. There are also provided communication apparatus and method, in which after a CPU issued a first message, a light emission intensity of an infrared LED is changed by the CPU so as to become the optimum state in accordance with the presence or absence of the response of a second message that is performed in response to the first message.

12 Claims, 5 Drawing Sheets

FIG. 5

# COMMUNICATION APPARATUS AND METHOD

BACKGROUND OF THE INVENTION

1. Field of the Invention

The invention relates to a communication apparatus for communicating by using a light.

2. Related Background Art

In recent years, communication apparatus for communicating by using a light has widely been put into practical use. There are various kinds of communication apparatuses such as an apparatus using a spatial transmission, an apparatus using an optical fiber, an apparatus for communicating by coming into contact with another apparatus, and the like.

In such conventional communication apparatuses, a light emitting device is driven by a predetermined light intensity (at least, in terms of an assumption such that the light intensity cannot be purposely changed) irrespective of a type of transmission path.

The light intensity is set to an intensity sufficient enough to assure the communication at the time of the maximum attenuation on the transmission path (for instance, in case of the apparatus using the optical fiber, the maximum length; in case of the apparatus for performing the spatial transmission, the maximum distance).

A light emitting device (light emitting diode, laser diode, or the like) which is used for light communication is driven by a current of about tens of mA to 150 mA. However, since a low electric power consumption of an electronic apparatus is progressively realized nowadays, there is a tendency such that a ratio of the electric power consumption of the light emitting device to the electric power consumption of the whole apparatus is increasing. Therefore, as in the foregoing conventional apparatuses, a method whereby the light emitting device is always driven by the light intensity corresponding to the maximum attenuation is very disadvantageous from a viewpoint of the realization of a low electric power consumption.

In case of the apparatus for communicating by coming into contact with another apparatus, an interval between the light emitting device and the photosensitive device is set to a predetermined distance and no problem occurs even if the light intensity is inherently set to a fixed value. However, in many cases, the light intensity is set to a slightly higher value in order to cope with a variation among devices, a deviation of the light axis at the time of installation, or the like. The apparatus is also not driven by the optimum light intensity.

To solve the above problems, there is considered a method whereby light intensity measuring means for measuring the light intensity is provided on the photosensitive device side and the measurement result of the light intensity measuring means is fed back to the light emitting device side, thereby setting the light intensity to a proper value. According to such a method, however, there is a problem such that not only light emission intensity varying means for varying the light emission intensity on the transmission side is provided but also the light intensity measuring means has to be provided on the reception side.

SUMMARY OF THE INVENTION

The present invention is made in consideration of the above conventional apparatuses and it is an object of the invention to provide a communication apparatus which can communicate by a proper light intensity without providing the light intensity measuring means on the reception side and can prevent an excessive electric power consumption.

Another object of the invention is to provide a communication apparatus for communicating using light, including light emission intensity setting means for setting a light emission intensity of a light emitting device; message issuing means for issuing a message by the set light emission intensity; and message receiving means for receiving the message issued by the message issuing means, wherein after the message issuing means issued a first message, in accordance with the presence or absence of the reception of a second message that is performed in response to the first message of the message receiving means, the light emission intensity of the light emitting device is set to the optimum state by the light emission intensity setting means.

Still another object of the invention is to provide a communication apparatus in which in the case where the message issuing means issues the first message and the message receiving means receives the second message, the light emission intensity setting means reduces the light emission intensity of the light emitting device for issuing the first message.

Yet another object of the invention is to provide a communication apparatus in which in the case where the message issuing means issues the first message and the message receiving means does not receive the second message, the light emission intensity setting means increases the light emission intensity of the light emitting device for issuing the first message.

Still another object of the invention is to provide a communication apparatus for communicating using light, including: light emission intensity setting means for setting a light emission intensity of a light emitting device; message issuing means for issuing a message by the set light emission intensity; message receiving means for receiving the message issued by the message issuing means; and memory means which is constructed in a manner such that, after the message issuing means issued a first message by the light emission intensity set by the light emission intensity setting means, in the case where the message receiving means receives a second message in response to the first message, the light emission intensity is stored as a success intensity.

Still another object of the invention is to provide a communication apparatus further having memory means which is constructed in a manner such that, after the message issuing means issued a first message by the light emission intensity set by the light emission intensity setting means, in the case where the message receiving means does not receive a second message in response to the first message, the light emission intensity is stored as a failure intensity.

Yet another object of the invention is to provide a communication apparatus, wherein in the case where the message issuing means issues the first message and the message receiving means receives the second message, the light emission intensity setting means sets the light emission intensity for issuing the next first message into the light emission intensity that is equal to half of the sum of the stored success intensity and failure intensity.

Yet another object of the invention is to provide a communication method of communicating by a light, including the steps of: setting a light emission intensity of a light emitting device; issuing a first message by the set light emission intensity; and setting the light emission intensity of the light emitting device into the optimum state in accordance with the presence or absence of the response of a second message that is performed in accordance with the first message.

Yet another object of the invention is to provide a communication method, wherein in the case where the first message is issued and the second message is received, the light emission intensity of the light emitting device for issuing the first message is reduced.

Still another object of the invention is to provide a communication method, wherein in the case where the first message is issued and the second message is not received, the light emission intensity of the light emitting device for issuing the first message is increased.

Still another object of the invention is to provide a communication method of communicating by a light, including the steps of: setting a first light emission intensity of a light emitting device; issuing a first message by the set first light emission intensity; setting the set first light emission intensity into a success intensity in the case where the second message is received in response to the first message and storing the set first light emission intensity into a failure intensity in the case where the second message is not received in response to the first message; and setting the second light emission intensity that is emitted after the first light emission intensity is set into the light emission intensity between the stored success intensity and failure intensity.

Yet another object of the invention is to provide a communication method, wherein the second light emission intensity is set into the light emission intensity that is equal to half of the sum of the stored success intensity and failure intensity.

After the message issuing means issued the first message, the light emission intensity of the light emitting device is changed and is set to the optimum state by the light emission intensity changing means in accordance with the presence or absence of the response of the second message that is performed in accordance with the first message. Due to this, the communication can be performed at the proper light intensity without providing the light intensity measuring means for the reception side. Wasteful electric power consumption by an excessive output is prevented.

DETAILED DESCRIPTION OF THE PREFERRED EMBODIMENTS

An embodiment of the invention will now be described hereinbelow with reference to the drawings.

Figure 1:
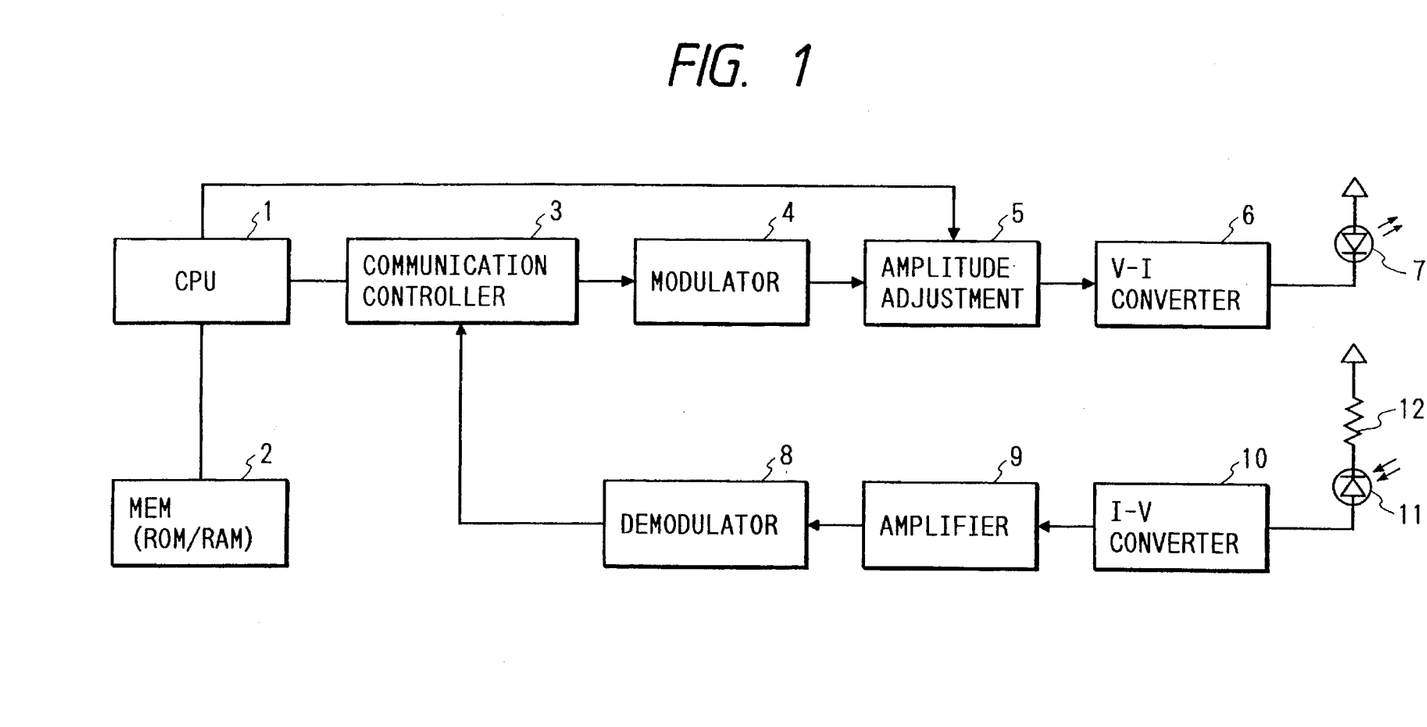
FIG. 1 is a block diagram showing a construction of a communication apparatus according to the first embodiment.

FIG. 1 is a block diagram showing a construction of a communication apparatus according to an embodiment of the invention. The communication apparatus uses a spatial propagation of infrared rays and executes a communication by connecting apparatuses in a wireless manner.

Figure 4:
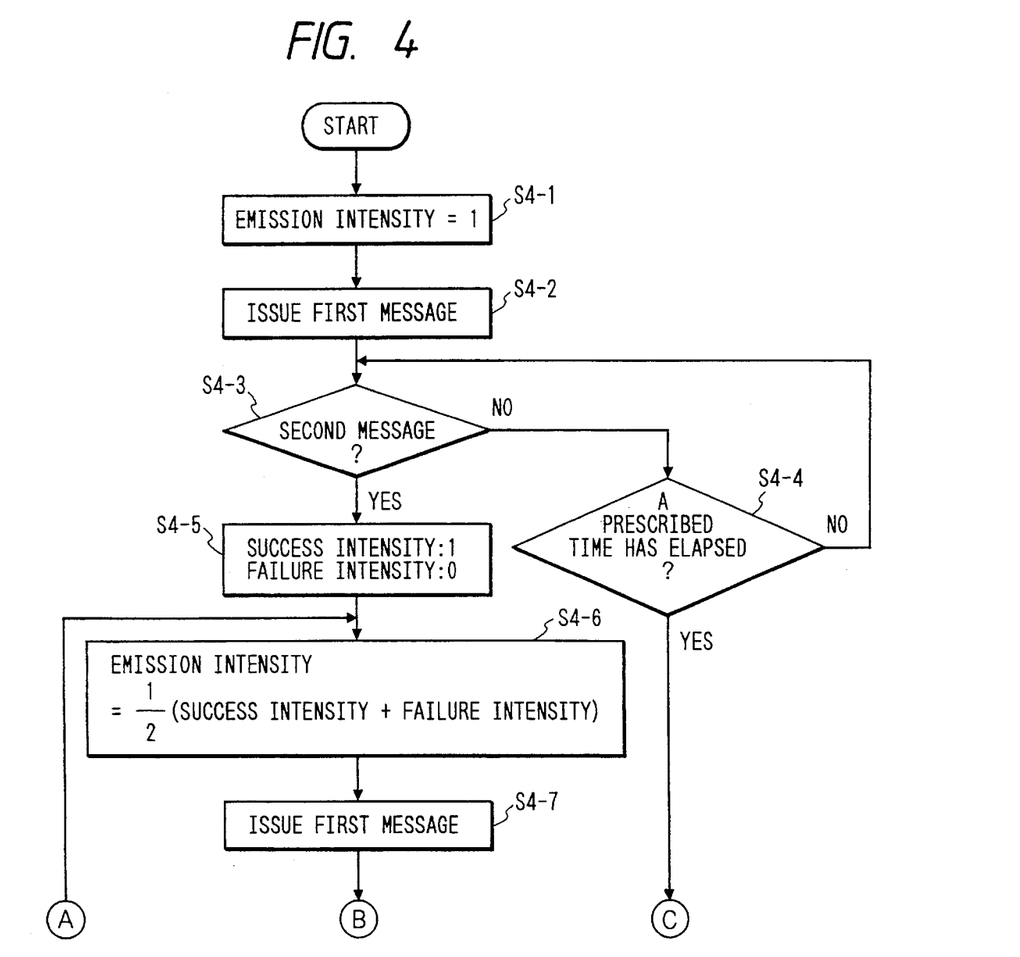
FIG. 4 is a flowchart showing a processing operation procedure to decide the optimum light emission intensity in the apparatus.
Figure 5:
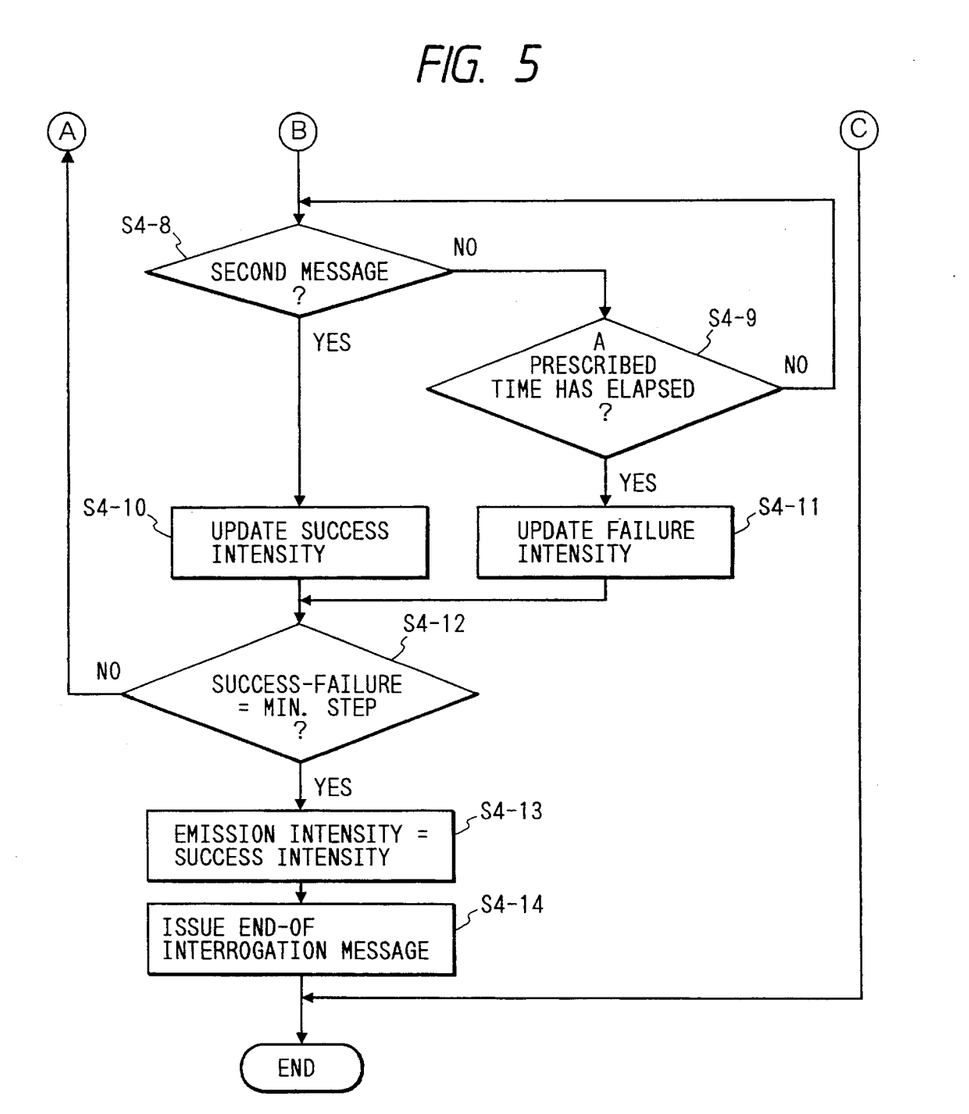
FIG. 5 is a flowchart showing a processing operation procedure to decide the optimum light emission intensity in the apparatus.

In FIG. 1, reference numeral 1 denotes a CPU (central processing unit) for controlling the whole communication apparatus; 2 indicates a memory (ROM/RAM) in which a control procedure shown in FIGS. 4 and 5 is stored and is executed by the CPU 1; 3 a communication controller comprising a parallel/serial converter, a coding/decoding apparatus, and the like; and 4 a modulator for modulating on the basis of an output from the communication controller 3. The modulator 4 modulates a predetermined subcarrier signal by a well-known modulating method such as QAM, FSK, PSK, or the like (a main carrier corresponds to infrared rays themselves which are emitted from an infrared LED 7, which will be explained hereinlater).

Reference numeral 5 denotes an amplitude adjustment circuit for adjusting an amplitude value of an output signal from the modulator 4 on the basis of a control signal from the CPU 1. Reference numeral 6 denotes a V-I converter for driving the infrared LED (light emitting device) by a radio wave value according to a magnitude of output of the amplitude adjustment circuit 5. Generally, the light emission intensity of the LED is proportional to the drive current. In the embodiment, therefore, the infrared LED 7 is driven by a desired light emission intensity by a control signal from the CPU 1.

Reference numeral 11 denotes a pin photodiode (photosensitive device) for converting a light signal into a current signal. The pin photodiode is molded by a resin for eliminating the visible light and only the infrared rays can transmit the resin. Reference numeral 12 denotes a resistor for applying an inverse bias to the pin photodiode 11, and 10 indicates an I-V converter for converting the current signal derived by the pin photodiode 11 into the voltage signal. The voltage signal is amplified by an amplifier 9 at the post stage and is sent to a demodulator 8. The signal received by the pin photodiode 11 is finally demodulated by the demodulator 8 and is output as a digital signal to the communication controller 3.

The directional characteristics of both of the infrared LED 7 and pin photodiode 11 are wide directional or omnidirectional in which a plurality of devices are combined. The communication can be performed irrespective of the direction of the communication apparatus.

Figure 2:
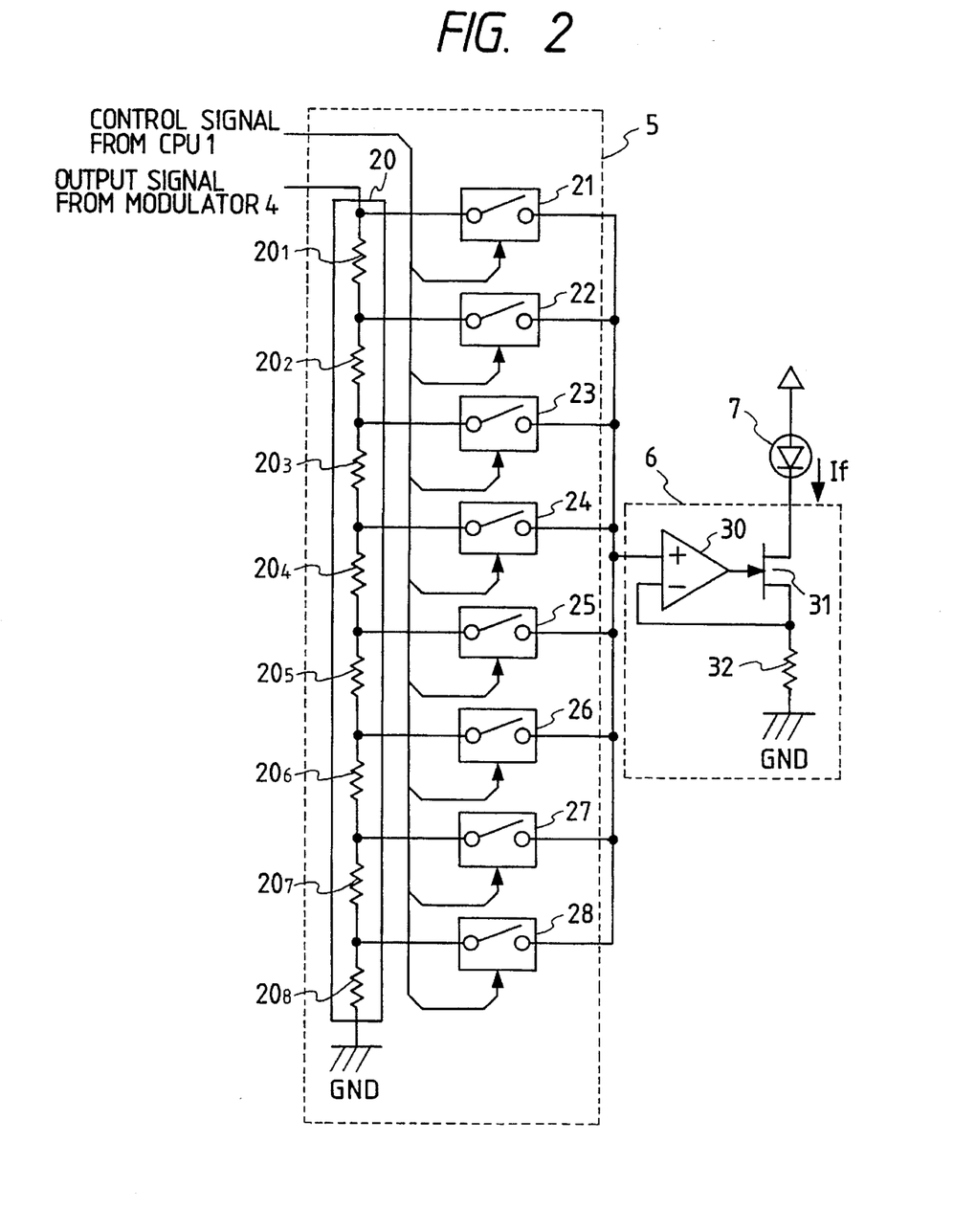
FIG. 2 is a block diagram showing a detailed construction of light emission intensity varying means in the apparatus.

FIG. 2 is a block diagram showing a detailed construction of the amplitude adjustment circuit 5 and V-I converter 6 in the communication apparatus of FIG. 1.

First, the amplitude adjustment circuit 5 will be first described. In FIG. 2, reference numeral 20 denotes a collective resistor comprising eight resistive devices $20_1$, $20_2$, $20_3$, $20_4$, $20_5$, $20_6$, $20_7$, and $20_8$ each having the same resistance value. The resistive devices $20_1$ to $20_8$ are serially connected and one end of each resistive device is connected to an output of the modulator 4 and the other end is connected to the ground GND. Analog switches 21, 22, 23, 24, 25, 26, 27, and 28 which are opened or closed by a control signal from the CPU 1 are connected to connecting points of the resistive devices $20_1$ to $20_8$, respectively.

The output of the modulator 4 is voltage divided by the eight resistive devices $20_1$ to $20_8$. Therefore, by controlling so as to close only either one of the analog switches 21 to 28, when assuming that the initial value is equal to 1, an amplitude value of a desired magnitude in a range from ⅛ to 1 can be taken out step by step on a ⅛ unit basis.

The V-I converter 6 will now be described. In FIG. 2, reference numeral 30 denotes an operational amplifier. The output of the amplitude adjustment circuit 5 is input to a plus (+) input terminal of the operational amplifier. An output of the operational amplifier 30 is fed back to a minus (−) input terminal of the operational amplifier 30 through an FET 31. Now, assuming that a voltage to the (+) input terminal is set to V and a current flowing is set to $I_f$ and a resistance value of a resistor 32 is set to R, the potentials at the (+) and (−) input terminals have the same value because of an imaginary short. Therefore, the following equation (1) is satisfied.

$$V=R \cdot I_f \tag{1}$$

Therefore, by changing the voltage V to the (+) input terminal, the drive current of the infrared LED 7 can be controlled.

A control operation procedure of the light emission intensity of the infrared LED 7 will now be described by using a flowchart shown in FIG. 3.

First, a first message 40 is issued by the maximum light emission intensity "1" from the [A] side to the [B] side. In response to it, [B] issues a second message 41. By receiving the second message 41, [A] can know that [B] is in a state in which the communication can be performed.

After that, [A] issues the first message a few times while changing the light emission intensity and searches the optimum light emission intensity in accordance with the presence or absence of the response of the second message corresponding to it. In the embodiment, the above process is executed by a binary search method (search which is executed to a set of items which were ordered; a method whereby the set is divided into two portions and one of them is abandoned and the above process is repeated for the accepted portion until the completion of the search).

Returning to FIG. 3, [A] issues a first message 42 by the light emission intensity "4/8" that is the half of that of the message 40. However, even after a prescribed time elapsed, a response message corresponding to the first message 42 from [A] is not returned from [B].

Therefore, [A] judges that the light emission intensity of "4/8" is insufficient, so that [A] again issues a first message 43 by increasing the light emission intensity to "6/8". In this instance, a second message 44 is returned from [B] to [A] in response to the first message 43. Subsequently, [A] again issues a first message 45 by reducing the light emission intensity to "5/8". In response to the first message 45, a second message 46 is returned from [B] to [A], so that the final light emission intensity is decided to "5/8".

As described above, the operations such that the light emission intensity is increased or decreased in accordance with the presence or absence of the response of the second message from [B] to [A] and the first message from [A] is issued are repeated a few times, so that the necessary minimum, namely, optimum light emission intensity can be searched.

According to the binary search method, assuming that the number of variable steps of the light emission intensity is set to (n), the number of searching times is set to the minimum integer (m) which satisfies the following equation (2).

$$m \geq \log_2 n + 1 \tag{2}$$

where, "1" in the right side denotes a light emission amount of the message at the light emission intensity "1" which was first performed.

In case of the embodiment, therefore, the optimum light emission intensity is decided by the search of four times as shown in the following equation (3).

$$4 = \log_2 8 + 1 \tag{3}$$

Generally, since the attenuation of the light signal on the transmission path on the going path is not so largely different from that on the returning path, the light emission intensity decided by the search from [A] to [B] can be used as it is as a light emission intensity from [B] to [A].

Figure 3:
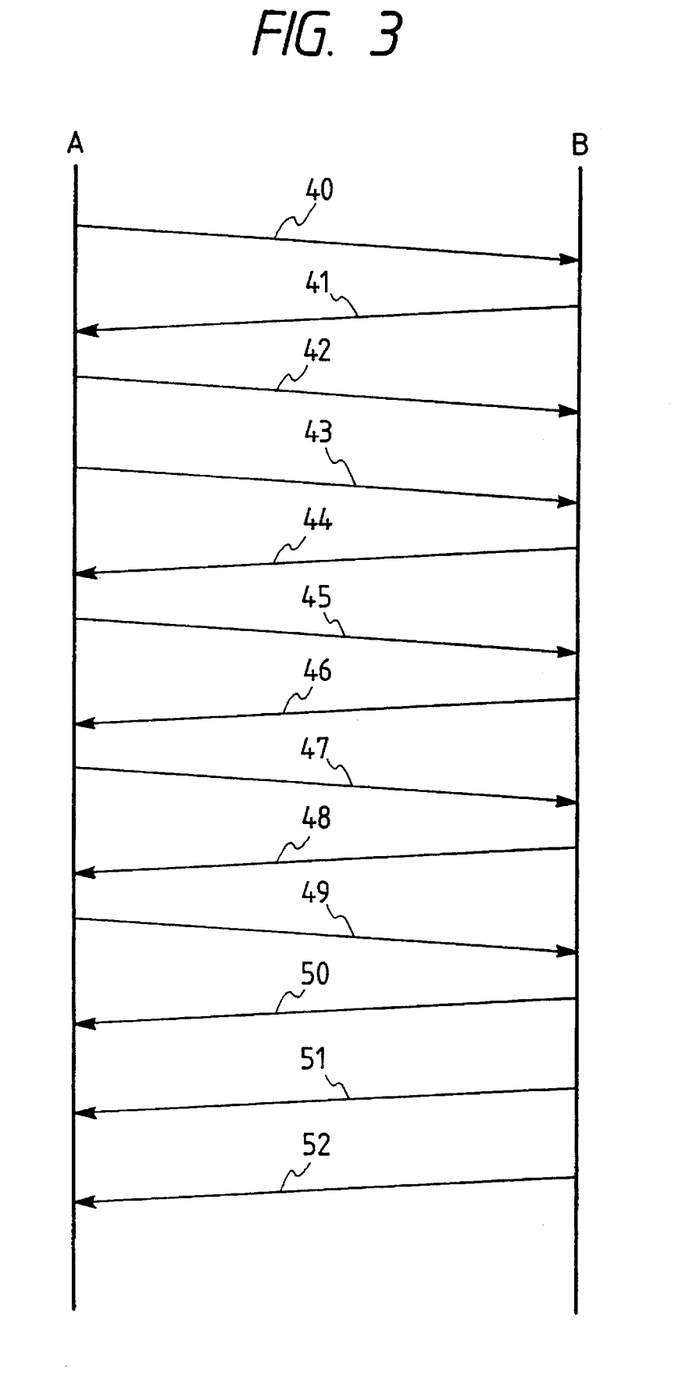
FIG. 3 is a flowchart showing a control operation procedure of the light emission intensity of an infrared LED in the apparatus.

In this case, in FIG. 3, a message 47 to inform the decided light emission intensity to the [B] side is generated by the light emission. After that, ordinary communication is performed by the light emission intensity (5/8 in the example of FIG. 3) regarding [A] and [B], respectively.

However, it will be also obviously presumed that the optimum light emission intensity from [B] to [A] differs from that the optimum light emission intensity from [A] to [B] due to a variation among resistive devices $21_1$ to $21_8$ or the like. In such a case, it is desirable to also execute the search from the [B] side to the [A] side. In this instance, the message 47 informs the completion of the searching operation from [A] to [B] without reporting the decided light emission intensity as mentioned above.

The number of searching times from [B] to [A] is reduced by "1" from the number in case of searching from [A] to [B] because there is no need to know the permission or inhibition of the communication on the partner side. Thus, the search number is set to three times in the case of the present embodiment.

A communication processing flow in this instance is shown in the lower half in FIG. 3. In the diagram, reference numerals 48, 50, and 52 show states in which the light emission intensities are set to "4/8", "2/8", and "3/8" by the first message that is issued from [B] to [A], respectively. As also shown in FIG. 3, a response message (second message from [A] to [B]) 49 is returned in response to the message 48 from [B]. However, no response is returned from [A] for messages 50 and 51 from [B].

Therefore, the light emission intensity "4/8" is determined as an optimum intensity. After that, [B] issues the message 52 to inform the end of the searching operation. Subsequently, [A] performs the ordinary communication by the light emission intensity of "5/8" or by the light emission intensity of "4/8".

FIGS. 4 and 5 are flowcharts showing a processing operation procedure to decide the optimum light emission intensity. First in step S4-1, the light emission intensity is set to the maximum output "1". In step S4-2, the first message at the light emission intensity set in step S4-1 is issued. In steps S4-3 and S4-4, the apparatus waits for the arrival of the second message from the communication partner for a prescribed time.

When no second message arrives even for a message sent at the maximum intensity, this means that the partner is absent or the partner side is in a state in which the communication cannot be performed. Therefore, the processing routine is interrupted and the processing routine is finished. When the second message arrives in step S4-3, the processes in step S4-5 and subsequent steps are performed in order to search for the optimum light emission intensity.

First in step S4-5, the success intensity is set to "1" and the failure intensity is set to "0" and those values are stored at predetermined locations in the memory. In step S4-6, the light emission intensity is set at a predetermined location in the memory 2 so as to be equal to the intermediate value (½ in this case) between the success intensity and the failure intensity. In step S4-7, the first message is again issued by the light emission intensity.

In steps S4-8 and S4-9 in FIG. 5, the apparatus waits for the arrival of the second message. In step S4-8, when the second message arrives, this means that the communication at the present light emission intensity succeeds. Therefore, in step S4-10, the success intensity is updated to the present light emission intensity and is stored at a predetermined location in the memory 2. After that, step S4-12 follows.

In step S4-8, when the second message doesn't arrive, this means that the communication cannot be performed at the present light emission intensity. Therefore, in step S4-11, the failure intensity is updated to the present light emission intensity and is stored at a predetermined location in the memory 2. After that, step S4-12 follows.

In step S4-12, a check is made to see if a difference between the success intensity and failure intensity stored in steps S4-10 and S4-11 is equal to the minimum step (⅛ in case of the embodiment) of the variable light emission intensity or not. When they are not equal, the processing routine is returned to step S4-6 in FIG. 4 and the processes are repeated from step S4-6. When it is judged that the difference is equal to the minimum step in step S4-12, step S4-13 follows. At this stage, since the minimum light emission intensity at which the communication can be performed has been stored as a success intensity at the predetermined location in the memory 2, such an intensity is set as a final light emission intensity in step S4-13. In step S4-14, a message indicative of the end of the searching operation is issued. After that, the processing routine is finished.

As mentioned above, in case of searching from the [B] side to the [A] side, the processes in steps S4-1 to S4-4 in FIG. 4 can be omitted.

In the embodiment, although the number of variable steps of the light emission intensity has been set to eight levels, the number of variable steps can be also obviously increased or decreased as necessary. By increasing the number of variable steps, the optimum light emission intensity can be decided more precisely. It is also considered that in case of the light emission intensity decided by the process shown in FIG. 4, a noise margin is a necessary minimum limit value. Therefore, in order to assure a more stable communication quality, the light emission intensity can be also set to a value that is slightly higher than the light emission intensity obtained by searching the light emission intensity by about one or two steps in consideration of a slight surplus.

As described above, according to the embodiment, by transmitting or receiving the message a few times, the necessary minimum light emission intensity is automatically set and wasteful electric power consumption due to the excessive output can be prevented. Moreover, in the embodiment, the light emission intensity varying means for varying the light emission intensity is merely provided on the transmission side. Additional hardware such as light emission intensity measuring means is unnecessary on the reception side.

Although the embodiment has been described above with respect to the case of alternately performing the search from [A] to [B] and the search from [B] to [A], they can be also simultaneously executed. In such a case, it is sufficient to construct in a manner such that, although the first message which is emitted from the apparatus itself changes the light emission intensity, the second message which is emitted in response to a message from the partner is always transmitted by the maximum output "1" and the second message is preferentially issued than the first message.

As will be understood from the above description, almost of the invention is embodied by the works on the transmission side (the reception side merely issues the second message of a response). This means that the invention can be applied to only one apparatus side of the communication. For example, in the case where a desk-top type apparatus using a commercially available AC power source is provided on the [B] side and a portable type apparatus that is driven by a battery is provided on the [A] side and the user wants to avoid an excessive output in only the apparatus on the [A] side under a severe power circumstance, the invention can be embodied without providing the means for varying the light emission intensity for the apparatus on the [B] side.

According to the latter method (method whereby the light intensity is fed back) of the conventional techniques, even if only the apparatus on the [A] side varies the light emission intensity, the light intensity measuring means is necessary on the [B] side. However, according to the invention, no additional hardware is necessary on the [B] side.

In case of simultaneously performing the search on both sides as described above and in case of embodying the invention on one side, no problem will occur even if the end of searching operation is not informed to the partner side. Therefore, the message to inform the end of searching operation described in the above embodiment can be also omitted.

Although the special messages for adjusting the light emission intensity have been used as first and second messages in the foregoing embodiment as a prerequisite, this is not a necessary condition of the invention. The invention merely requests that, when a special message is issued by light emission, there is a special message that is returned in response to it. Therefore, as such special messages, other messages which are used for another object can be also used.

That is, if the transmission and reception of messages (including a packet or the like) which satisfy the above requirement have been specified in an existing communication protocol, such messages can be used as first and second messages in the invention.

When the above point is considered together with a point that the invention can be used on only one side of the communication, the communication apparatus embodying the invention can be also connected to a communication apparatus using the conventional technique and the existing communication protocol.

Further, although the above embodiment has been described with respect to the communication apparatus using a spatial transmission as a transmission path as an example, the invention is not limited to such an example and can be also applied to a light communication of a transmission path of a wide system.

According to the communication apparatus of the invention as described above, after the message issuing means issued the first message, the light emission intensity of the light emitting device is changed by the light emission intensity changing means in accordance with the presence or absence of the response of the second message that is performed in response to the first message and is automatically set into the optimum light emission intensity. Therefore, the communication can be performed at the proper light intensity without providing the light intensity measuring means on the reception side. Wasteful electric power consumption due to an excessive output can be prevented. The invention has wide flexibility such that the invention can be commonly used together with the existing protocol which can be also embodied on one side of the communication, or the like.

What is claimed is:

1. A communication apparatus for communicating with another apparatus using light, comprising:

light emission intensity setting means for setting a light emission intensity of a light emitting device;

message issuing means for issuing a first message in a plurality of light emission intensities set by said light emission intensity setting means;

message receiving means for receiving a message from the another apparatus; and determining means for determining whether said message receiving means has received a second message from the another apparatus in response to the first message issued by said message issuing means, wherein in response to a determination by said determining means that said message receiving means has received the second message, said light emission intensity setting means sets the lowest one of the plurality of light emission intensities for subsequent communication.

2. An apparatus according to claim 1, wherein in the case where said message issuing means issues the first message and said message receiving means receives the second message, said light emission intensity setting means sets the light emission intensity of said light emitting device for subsequent communication.

3. An apparatus according to claim 1, wherein in the case where said message issuing means issues the first message and said message receiving means does not receive the second message, said light emission intensity setting means increases the light emission intensity of said light emitting device for issuing the first message.

4. A communication apparatus for communicating with another apparatus using light, comprising:

light emission intensity setting means for setting a light emission intensity of a light emitting device;

message issuing means for issuing a first message in the light emission intensity set by said light emission intensity setting means;

message receiving means for receiving a message from the another apparatus;

determining means for determining whether said message receiving means has received a second message from the another apparatus in response to the first message issued by said message issuing means; and memory means for storing, as a success intensity, the light emission intensity in which the first message was issued, in response to a determination by said determining means that said message receiving means has received the second message.

5. An apparatus according to claim 4, further having memory means which is constructed in a manner such that, after said message issuing means issued the first message by the light emission intensity set by said light emission intensity setting means, in the case where said message receiving means does not receive the second message in response to the first message, said light emission intensity is stored as a failure intensity.

6. An apparatus according to claim 5, wherein in the case where said message issuing means issues the first message and said message receiving means receives the second message, said light emission intensity setting means sets the light emission intensity for issuing the next first message using the light emission intensity that is equal to half of a sum of said stored success intensity and said failure intensity.

7. An apparatus according to claim 4, wherein in the case where said message issuing means issues the first message and said message receiving means receives the second message, said light emission intensity setting means sets the light emission intensity for issuing the next first message using the light emission intensity that is equal to half of a sum of said stored success intensity and a failure intensity.

8. A communication method for communication between communication apparatuses using light, comprising the steps of:

setting a plurality of light emission intensities of a light emitting device in a first communication apparatus;

issuing a first message in the plurality of light emission intensities set by a light emission intensity setting means in the first communication apparatus;

determining whether a second message has been received by the first communication apparatus from a second communication apparatus in response to the first message; and selecting the lowest one of the plurality of light emission intensities for subsequent communication when the determining step identifies that the second message has been received.

9. A method according to claim 8, wherein in the case where the first message is issued and the second message is received, the light emission intensity of said light emitting device for subsequent communication is reduced.

10. A method according to claim 8, wherein in the case where the first message is issued and the second message is not received, the light emission intensity of said light emitting device for issuing the first message is increased.

11. A communication method for communication between communication apparatuses using light, comprising the steps of:

setting a first light emission intensity of a light emitting device in a first light communication apparatus;

issuing a first message at the first light emission intensity set by light emission intensity setting means;

determining whether the first light communication apparatus has received a second message from a second communication apparatus in response to the first message;

storing the set first light emission intensity as a success intensity in the case where the second message is received in response to the first message and storing the set first light emission intensity as a failure intensity in the case where the second message is not received in response to the first message; and setting a second light emission intensity that is emitted after the first message issued at the first light emission intensity to a light emission intensity between the success intensity and failure intensity stored in said storing step.

12. A method according to claim 11, wherein the second light emission intensity is set to the light emission intensity that is equal to half of a sum of the stored success intensity and failure intensity.

* * * * *

UNITED STATES PATENT AND TRADEMARK OFFICE
CERTIFICATE OF CORRECTION

PATENT NO. : 5,517,608     Page 1 of 2
DATED : May 14, 1996
INVENTOR(S) : Noriyuki SUZUKI, et al.

It is certified that error appears in the above-indentified patent and that said Letters Patent is hereby corrected as shown below:

<u>ON THE COVER PAGE - ITEM [56] - References Cited - U.S. PATENT DOCUMENTS</u>:

"Ogawahara" should read --Ogasahara--.

<u>COLUMN 1</u>:

Line 21, "enough" should be deleted.

<u>COLUMN 2</u>:

Line 31, "including:" should read --including--.

<u>COLUMN 6</u>:

Line 13, "that" should be deleted.

UNITED STATES PATENT AND TRADEMARK OFFICE
CERTIFICATE OF CORRECTION

PATENT NO. : 5,517,608
DATED : May 14, 1996
INVENTOR(S) : Noriyuki SUZUKI, et al.

Page 2 of 2

It is certified that error appears in the above-indentified patent and that said Letters Patent is hereby corrected as shown below:

COLUMN 7:

Line 5, "doesn't" should read --does not--; and,

Line 63, "almost" should read --almost all--.

Signed and Sealed this

Twenty-fourth Day of December, 1996

Attest:

BRUCE LEHMAN

*Attesting Officer*  *Commissioner of Patents and Trademarks*